V. M. McDONALD.
WIRE AND CABLE PULLER.
APPLICATION FILED MAR. 10, 1920.
1,378,702.
Patented May 17, 1921.
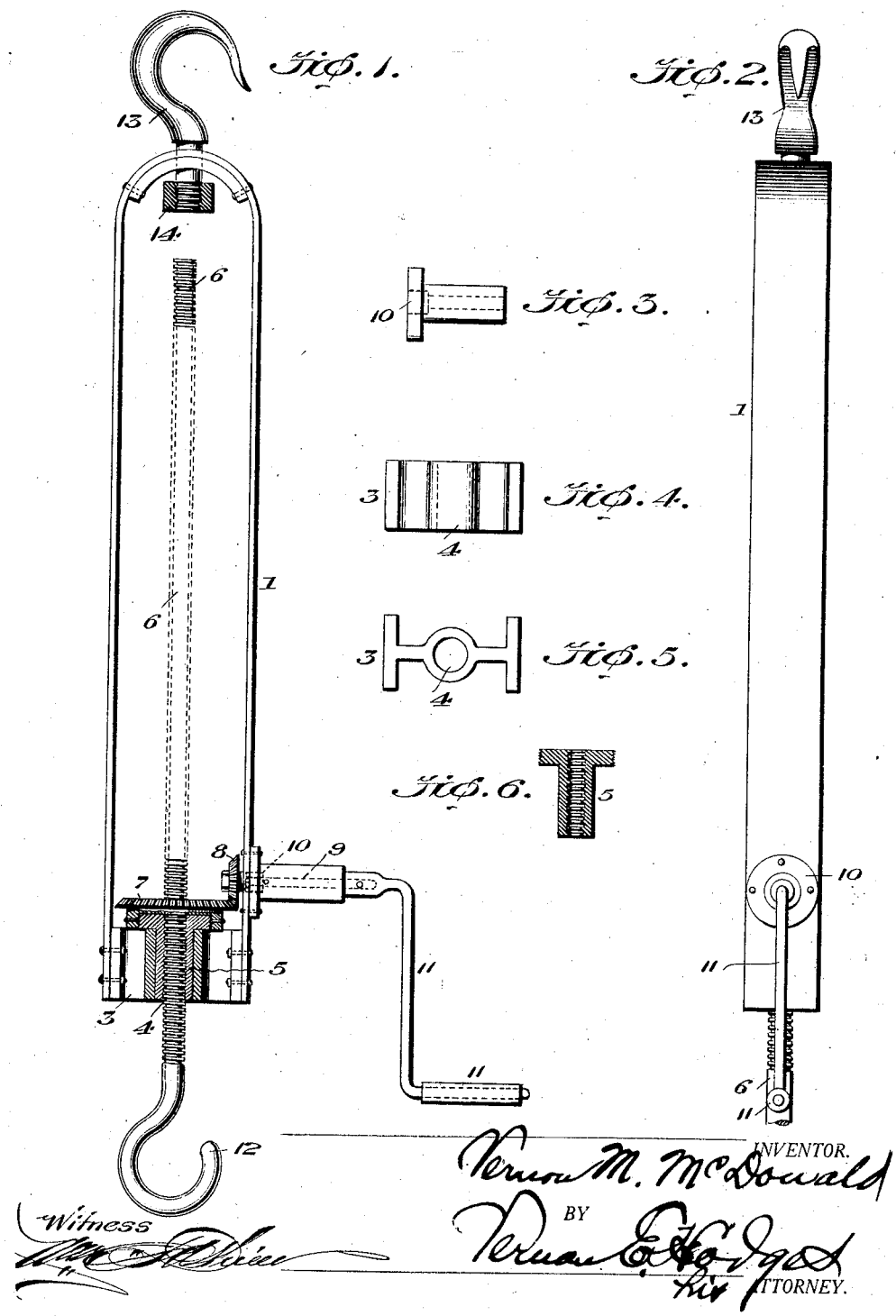

UNITED STATES PATENT OFFICE.

VERNON M. McDONALD, OF DENVER, COLORADO, ASSIGNOR OF FIFTY-FIVE ONE-HUNDREDTHS TO JAMES ROBERT KEARNEY, OF KANSAS CITY, MISSOURI.

WIRE AND CABLE PULLER.

1,378,702.

Specification of Letters Patent. Patented May 17, 1921.

Application filed March 10, 1920. Serial No. 364,779.

*To all whom it may concern:*

Be it known that I, VERNON M. McDONALD, a citizen of the United States, residing at the city and county of Denver and State of Colorado, have invented certain new and useful Improvements in Wire and Cable Pullers, of which the following is a specification.

My invention relates to an improvement in wire and cable pullers, and an object is to provide a device having the qualities of lightness, durability and simplicity in operation, and which will efficiently accomplish the work of several men and a great many extra parts and paraphernalia.

A further object resides in the performance of the function for which it was especially devised, which is to stretch and hold telegraph and telephone wires, trolley work, pulley-guys, replacing strain insulators, or even putting in cable-ways where it is necessary to take up and let out slack, as well as to provide a tool that can be used to pull automobiles or auto trucks out of sand or mud, excavations, or the like, and which will also be adaptable to the stretching of barb or other wire.

In the accompanying drawings:—

Figure 1 is a view in side elevation with parts in section of my improved tool;

Fig. 2 is an edge view or view taken at right-angles to Fig. 1;

Figs. 3, 4, 5 and 6 are details of castings and bushings.

The numeral 1 represents the frame of my improved slack puller. This may be made of a bar of strap iron or the like of sufficient dimensions, and is preferably bent at the middle where it is lined by a saddle-block 2 riveted or bolted in place to preserve the curve and give strength and rigidity at that point. The extreme ends are riveted or bolted to a casting 3 shown in detail in Figs. 4 and 5, which holds the ends together and completes the frame. This casting has a bore 4 at the center, and a bronze bushing 5 (shown in Fig. 6) is journaled therein. This bushing has internal screw-threads which engage the threads of a tension-rod 6, which is moved endwise as the bushing is turned.

A bevel-gear 7 is secured to this bushing, and a bevel-gear 8 on a crank-axle 9 transmits motion to the bevel-gear 7 for imparting endwise movement to the tension-rod. This crank axle extends through a ball-bearing socket 10 (shown in Fig. 3 in detail) bolted to the side of the frame, and the crank axle has a handle 11 on its outer end by which it is turned.

The tension-rod 6 has a hook or eye 12 at its outer end for attachment to the wire or cable or other object to be pulled. At the opposite end, a similar hook or eye 13 is swiveled through the bend in the frame and saddle-block 2, and this hook or eye 13 is held removably in place by a nut 14.

The bevel-gears can be replaced or changed to various ratios according to requirements, as both are made removable.

The machine may be made in different sizes for light and heavy work. It can be used with two come-alongs or one come-along, and hooked to fixed support if desired.

Various interchangeable devices (not illustrated by any of the forms in common use) may be attached at this point in lieu of the hook or eye 13.

The operation is most simple, as it is only necessary to attach the two ends and turn the crank to apply tension to the parts to be pulled or stretched. By the use of my improved device, I am able to dispense with the services of several men and a number of tools that have hitherto been absolutely necessary to do what can be accomplished by this one tool.

I claim:

1. The combination with a frame made of a bar of metal bent at the center, a casting having a bore connecting its ends, a bushing rotatable in the bore, and means for turning the bushing, of a tension-rod having threads which the internal threads of the bushing engage, whereby said rod is moved endwise as the bushing is turned.

2. The combination with a frame made of a bar of metal bent at the center, a casting having a bore connecting its ends, a bushing rotatable in the bore, and means for turning the bushing, of a tension-rod having threads which the internal threads of the bushing engage, whereby said rod is moved endwise as the bushing is turned, and an interchangeable device swiveled at the opposite end of the frame and removable therefrom.

3. The combination with a frame made of a bar of metal bent at the center, a casting secured to the ends thereof, said casting having a bore therethrough, a bushing rotatably fitted to the bore and having internal screw-threads, a threaded tension-rod which these threads engage, a bevel-gear removably secured to the bushing, and a crank-axle having a removable bevel-gear thereon for engaging the teeth of the gear on the bushing.

4. The combination with a frame made of a bar of metal bent at the center, a casting secured to the ends thereof, said casting having a bore therethrough, a bushing rotatably fitted to the bore and having internal screw-threads, a threaded tension-rod which these threads engage, a bevel-gear removably secured to the bushing, a crank-axle having a removable bevel-gear thereon for engaging the teeth of the gear on the bushing, and a ball-bearing socket secured to the side of the frame to form a bearing for the crank-axle.

In testimony whereof I affix my signature.

VERNON M. McDONALD.